G. W. Cooke,
Spoke Machine.
Nº 18,680.   Patented Nov. 24, 1857.
2 Sheets, Sheet 2.
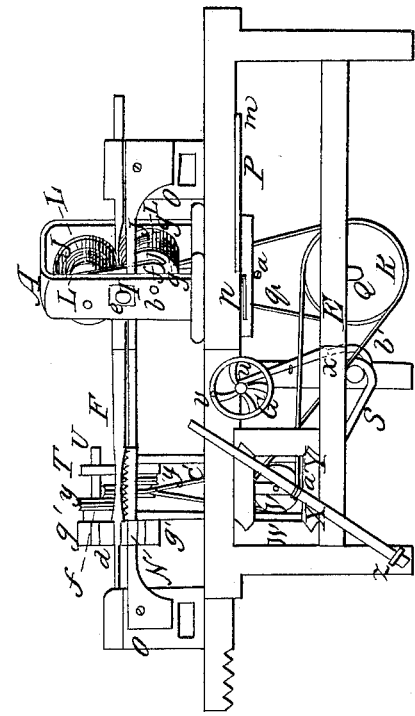
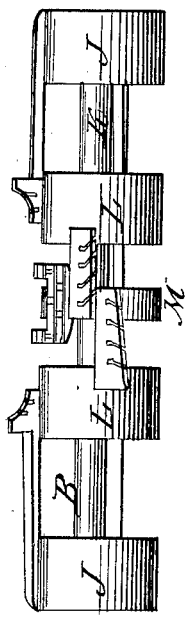
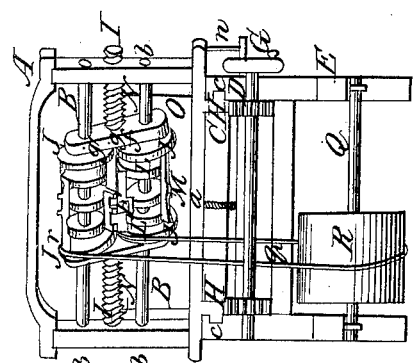
Witnesses:
Moses Dodd
Horace Freeman
Inventor.
Geo. W. Cooke

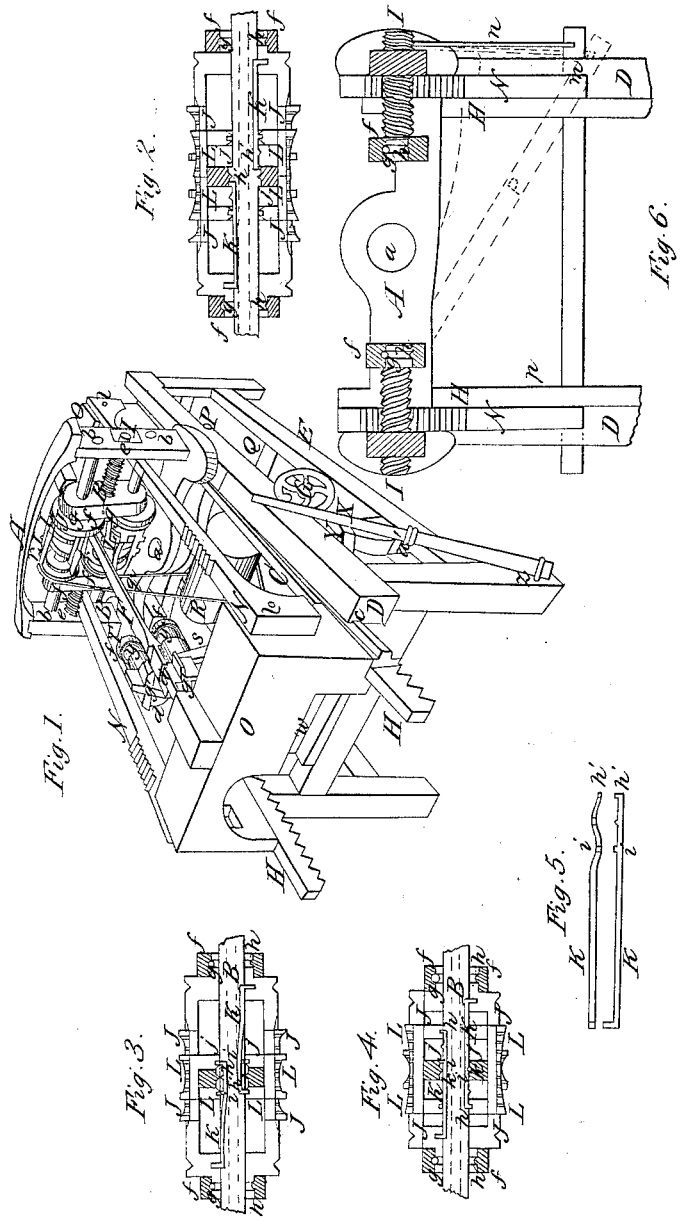

UNITED STATES PATENT OFFICE.

GEO. W. COOKE, OF SPRINGFIELD, NEW JERSEY.

SPOKE-MACHINE.

Specification of Letters Patent No. 18,680, dated November 24, 1857.

*To all whom it may concern:*

Be it known that I, GEO. W. COOKE, of Springfield, in the county of Essex and State of New Jersey, have invented a new and useful Machine for Planing and Tenoning Spokes; and I do hereby declare that the following is a full, clear, and exact description of the same, reference being had to the annexed drawings, making a part of this specification, in which—

Figure 1 is a perspective view. Fig. 2 is a plan of the first position of cutters and springs. Fig. 3 is the second position, Fig. 4 the third position. Fig. 5 is a side and flat view of springs. Fig. 6 is a plan of right and left cog screws and lever P. Fig. 7 is a transverse section of the machine. Fig. 8 is a vertical and longitudinal view. Fig. 9 is a view of the surface of the cutters.

Similar letters indicate corresponding parts in the figures.

In the machine which forms the subject of this invention, rotary cutters are employed, and the work or article to be planed has a horizontal and longitudinal action. The work only passes through the machine once to complete the same, the cutters acting with a lateral and a circular movement cutting into it to the full depth necessary to reduce it, and every revolution of the cutters finishing a portion of the surface of the work.

A, is a movable frame acting on pivot, $a$, carrying the journals $b$, $b$, of the rotary cutter shafts B B, whose cutters have their edges made in part of a form corresponding with the transverse profile to be produced by the planing operation the surface of the cutters are divided lengthwise and obliquely the sections or teeth of the cutters acting alternately on the work.

C is a sliding carriage acting in slides $c$ $c$, on inside of beds D D, of frame E.

$d$ $d$, are centers between which the material or article F to be planed is placed.

G G are pinions turned by hand of the operator acting in racks H H, which carry the sliding carriage C and the article F to be planed and operated on.

I I are right and left cog screws attached to uprights of frame A and carrying in nuts $e$ $e$.

J J J J are quarter oval cutter holders carrying on cutter shafts B B, which are loosely attached to couplers $f$, $f$, by keys $g$ $g$ acting in grooves $h$ $h$, right and left cog screws I I are loosely attached in the same way to the couplers by keys $g$, $g$, acting in grooves $h$ $h$. Springs K K K K are attached to the inside of quarter oval cutter holders lying in grooves on the cutter shafts B B.

L L L L are the neck cutter holders carrying on shafts B B which are temporarily attached to the springs by stops $i$ $i$ $i$ $i$ on the springs.

M M are the half square or center cutter holders which are stationary on the shafts B B.

$j$ $j$ are apertures in the square cutter holders for the passage of the springs when in operation. $k$ $k$ are projections in the same for the purpose of compressing the springs in their operations.

N N are racks attached to heads O O of sliding frame C by screws $l$, $l$, $l$, $l$, which operate on right and left cog screws which rotates the same.

P is a lever acting on a pivot $m$, and connected by a rod $n$, to base of cutter frame A at $o$, moved by rod $p$.

Q is the main shaft of the machine. This carries drum R from which belt $q$ runs to grooves $r$ $r$, on quarter oval cutter holders which rotates the same.

$s$ is a lever attached to the frame E by and acting on pivot $t$.

$u$ and $v$ are stops which operate on the same.

S is a crooked lever acting on pivot $w$. The levers S and $s$ are connected together at $x$.

T is the tenoning cutter frame carrying the journals of the rotary tenoning cutter shafts U U. $y$, $y$, are pulleys on the same.

V is a drum inside the tenoning frame W.

X is a lever attached to the lower part of one of the posts of the machine at $z$ and connected to the tenoning slide Y, by rod $a'$. Belt $b'$ from drum R turns drum V; belt $c'$ from drum V turns pulley $d'$; belts $e'$ and $f'$ from pulley $d'$ to pulleys $y$, $y$, turn the tenoning cutters $g'$, $g'$.

I will now proceed to describe the operation of the machine before placing the material between the centers $d$ $d$. The sliding carriage C is to be extended; the machine is put in motion by drum R; belt $q$ runs from the same to grooves $r$, $r$, which rotate the shaping cutters; the sliding carriage is moved by pinions G G acting on racks H H which carry the material to be operated on toward the shaping cutters; cutters M M commence cutting first which produces the square of the spoke; racks N N turn right and left cog screws I I which are moved laterally toward the spoke by the action produced by the thread of the nuts $e\ e$, carrying the quarter oval cutters and the neck cutters by means of springs K; the neck cutters next commence cutting; when the holders of the same have reached the center cutter holders, the first half of the neck of the spoke becomes shaped; the springs are then compressed by means of the center stops of the springs coming in contact with the projections $k\ k$ in the apertures of center cutter holders which detach the springs from the neck cutter holders. When the center stops of the springs have passed the projections the springs rise and become again attached to the neck cutter holders by the end stops $h'\ h'\ h'\ h'$ of the springs when the neck cutters commence receding and cutting the remainder of the neck of the spoke; at the same time the quarter oval cutters advance and gradually cover the neck, cutting and produce the oval shape of the spoke; the lateral movement of the cutters produce the inclination of the shapes produced. Lever P operated on by rod $p$ gradually moves by means of rod $n$ the shaping cutters obliquely which produces the taper of the spoke by gradual degrees, likewise gradually shortens the length of the oval; before the spoke is quite finished or planed stop $u$ coming in contact with lever $s$ moves the same forward and by acting on leves S which is attached to the lower part of tenoning frame T, causes the same to rise, when belt $c'$ becomes tightened and the tenoning cutters commence revolving; lever X extended outward by the operator causes the tenoning cutters to act upon the spoke and cut the tenon, when the spoke at one pass through the machine is finished. The spoke is removed when by a backward action of pinions G G, the tenoning cutter frame is lowered by means of stop $v$ acting on lever $s$, which moves the same back to its first position. A counter action of the cog screws opens the shaping cutters to their first position when the machine is ready for a new piece of material to be put through the same operation.

This machine is admirably adapted for the purpose it is intended for, on account of its accuracy in producing the various shapes, and the inclination of the shapes produced together with the correct principle of tapering the same.

Having thus fully described the nature of my invention, I would state that I do not claim the tenoning part of the machine, but

What I do claim as new is—

The planing of spokes with rotary cutters whose surface or circumference is divided by grooves the edges thereby being in sections or teeth the same acting alternately on the work, in combination with lever P springs K and cog screws II for the purpose of producing the lateral and oblique movements of the cutters substantially as described.

GEO. W. COOKE.

Witnesses:
 MOSES DODD,
 HORACE FREEMAN.